(12) United States Patent
Lee et al.

(10) Patent No.: US 9,058,075 B2
(45) Date of Patent: Jun. 16, 2015

(54) DISPLAY DEVICE INCLUDING TOUCH SENSOR AND DRIVING METHOD THEREOF

(71) Applicant: Samsung Display Co., Ltd., Yongin, Gyeonggi-Do (KR)

(72) Inventors: Il Ho Lee, Hwaseong-si (KR); Seung Ho Nam, Seongnam-si (KR); Seong Mo Hwang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 88 days.

(21) Appl. No.: 14/029,673

(22) Filed: Sep. 17, 2013

(65) Prior Publication Data

US 2014/0347284 A1 Nov. 27, 2014

(30) Foreign Application Priority Data

May 27, 2013 (KR) ........................ 10-2013-0059705

(51) Int. Cl.
*G06F 3/041* (2006.01)
(52) U.S. Cl.
CPC ..................................... *G06F 3/041* (2013.01)
(58) Field of Classification Search
CPC ....................................................... G06F 3/041
USPC ........................................................ 345/173
See application file for complete search history.

(56) References Cited

U.S. PATENT DOCUMENTS

| | | | |
|---|---|---|---|
| 5,923,320 A * | 7/1999 | Murakami et al. | 345/179 |
| 6,239,788 B1 * | 5/2001 | Nohno et al. | 345/173 |
| 7,995,041 B2 | 8/2011 | Chang | |
| 8,040,326 B2 | 10/2011 | Hotelling et al. | |
| 8,760,409 B2 * | 6/2014 | Kinoshita et al. | 345/173 |
| 8,896,567 B2 * | 11/2014 | Kim et al. | 345/174 |
| 2009/0058831 A1 | 3/2009 | Chen et al. | |
| 2010/0182273 A1 | 7/2010 | Noguchi et al. | |
| 2010/0194695 A1 | 8/2010 | Hotelling et al. | |
| 2011/0090174 A1 | 4/2011 | Lin | |
| 2012/0044166 A1 | 2/2012 | Mizuhashi et al. | |
| 2012/0169629 A1 * | 7/2012 | Shih et al. | 345/173 |
| 2012/0242597 A1 * | 9/2012 | Hwang et al. | 345/173 |
| 2012/0268423 A1 | 10/2012 | Hotelling et al. | |
| 2013/0050130 A1 * | 2/2013 | Brown | 345/174 |
| 2013/0342481 A1 * | 12/2013 | Small et al. | 345/173 |

FOREIGN PATENT DOCUMENTS

| | | |
|---|---|---|
| KR | 10-2008-0014296 | 2/2008 |
| KR | 10-2012-0097762 | 9/2012 |
| KR | 10-1212420 | 12/2012 |
| KR | 10-2013-0004658 | 1/2013 |

* cited by examiner

*Primary Examiner* — Tom Sheng
(74) *Attorney, Agent, or Firm* — Innovation Counsel LLP

(57) ABSTRACT

The present invention relates to a display device including a touch sensor and a driving method thereof. A display device according to an exemplary embodiment of the present invention includes a plurality of data lines which extends in a first direction, a plurality of sensing output lines which extends in a second direction which is not parallel to the first direction and transmits a sensing output signal, a pixel electrode which is connected with the data line through a switching element, a touch sensor which is connected to the data line and the sensing output line and detects a touch, and a data driver which applies a displaying data voltage to the plurality of data lines during the image display period for one frame and applies a sensing input signal during a touch sensing period for one frame. The touch sensing period is included in a vertical blank period of the frame.

20 Claims, 12 Drawing Sheets

DISPLAY DEVICE INCLUDING TOUCH SENSOR AND DRIVING METHOD THEREOF

CROSS-REFERENCE TO RELATED APPLICATION

This application claims priority to and the benefit of Korean Patent Application No. 10-2013-0059705 filed in the Korean Intellectual Property Office on May 27, 2013, the entire contents of which are incorporated herein by reference.

BACKGROUND (a) Technical Field

Embodiments of the present invention relate to a display device including a touch sensor and a driving method thereof.

(b) Description of the Related Art

A flat panel display such as a liquid crystal display (LCD), an organic light emitting diode display (OLED display) and an electrophoretic display includes a field generating electrode and an electro-optical active layer. The liquid crystal display includes a liquid crystal layer as an electro-optical active layer, the organic light emitting diode display includes an organic emission layer as an electro-optical active layer, and the electrophoretic display may include charged particles as an electro-optical active layer. The field generating electrode is connected to a switching element such as a thin film transistor and is applied with a data signal and the electro-optical active layer converts the data signal into an optical signal to display an image.

Recently, in addition to a function of displaying an image, the flat panel display may have a touch sensing function which allows interaction with a user. When a user writes a letter or draws a picture on a screen by touching a finger or a touch pen, the touch sensing function detects a change in a pressure, a charge, or light which is applied to the screen by a display device to find out touch information such as occurrence and position of touch. The display device may be operated based on the touch information.

Such a touch sensing function may be implemented by a touch sensor. The touch sensor may be classified into a resistive type, a capacitive type, an electro-magnetic type (EM) or an optical type in accordance with methods used to sense the touch.

The capacitive type touch sensor includes a sensing capacitor and detects a touch using a change in a capacitance of the sensing capacitor when a conductor such as a finger approaches or contacts the sensor.

However, in order to install the sensor in the display device, an additional circuit which is formed on an inner surface or an outer surface of the display device may require which reduce an aperture ratio and transmittance of the display device.

The above information disclosed in this Background section is only for enhancement of understanding of the background of the invention and therefore it may contain information that does not form the prior art that is already known in this country to a person of ordinary skill in the art.

SUMMARY

Embodiment of the present invention have been made in an effort to provide a display device including a touch sensor which may be light, thin, reduced power consumption, reduced number of optical masks required to manufacturing the display device and reduced manufacturing cost.

Embodiments of the present invention have been made in an effort to further provide a display device including a touch sensor which may easily avoid an external noise during a touch sensing operation.

An exemplary embodiment of the present invention provides a display device including: a plurality of data lines which extend in a first direction; a plurality of sensing output lines which extend in a second direction which is not parallel to the first direction and transmit a sensing output signal; a pixel electrode which is connected with a data line of the plurality of data lines through a switching element; a touch sensor which is connected to the data line and a sensing output line of the plurality of sensing output lines and detects a touch; and a data driver which disconnect the plurality of data lines from each other to apply displaying data voltages to the respective data lines during an image display period of a frame, and connect a portion of the data lines to each other to form a plurality of sensing input lines to apply sensing input signals to the plurality of sensing input lines during a touch sensing period of the frame after the image display period, in which the touch sensing period is included in a vertical blank period of the frame.

The display device may further include a gate driver which transmits a gate signal to the switching element during the image display period.

The data driver may convert an output image signal into the displaying data voltage using a plurality of gray voltages and convert a sensing input data into the sensing input signal using the plurality of gray voltages.

During the touch sensing period, the plurality of data lines are grouped into a plurality of sensing input lines having at least one data line and the sensing input signals which are transmitted by the plurality of sensing input lines may be coded differently.

The sensing input data may include white gray data and black gray data.

The sensing input signal may be applied to the data line in accordance with a data load signal.

The display device may further include a common electrode which transmits a common voltage and generates an electric field together with the pixel electrode, and a common electrode controller which divides the common electrode into a plurality of blocks to form the plurality of sensing output lines during the touch sensing period.

The common electrode controller may connect the plurality of blocks of the common electrode to a common voltage source during the image display period.

The display device may further include a first substrate on which the switching element and the pixel electrode are formed and the sensing output line may be disposed on an outer surface of the first substrate.

The display device may further include a first substrate on which the switching element and the pixel electrode are formed and a second substrate which faces the second substrate. The sensing output line may be disposed on an outer surface or an inner surface of the second substrate.

The sensing output line may include a transparent conductive material including ITO and IZO.

Another exemplary embodiment of the present invention provides a driving method of a display device including a plurality of data lines which extend in a first direction, a plurality of sensing output lines which extend in a second direction which is not parallel to the first direction, and a touch sensor which is connected to a data line of the plurality of data lines and a sensing output line of the plurality of sensing output lines and detects a touch, the method comprising: applying displaying data voltages to the plurality of data lines during an image display period of a frame; applying a sensing input signal to the plurality of data lines during a touch sensing period of the frame after the image display period; and outputting sensing output signals to the plurality of sensing output lines, in which the touch sensing period is included in a vertical blank period of the frame The method may further include transmitting a gate signal to the switching element which is connected to the data line during the image display period.

The method may further include converting an output image signal which is a digital signal into the displaying data voltage using a plurality of gray voltages, and converting a sensing input data which is a digital signal into the sensing input signal using the plurality of gray voltages.

During the touch sensing period, the plurality of data lines may form a plurality of sensing input lines, each of the plurality of sensing input lines including at least one data line, and the input sensing signal includes a plurality of sensing input signals which are transmitted by the plurality of sensing input lines, the sensing input signals being coded differently.

The sensing input data may include white gray data and black gray data.

The sensing input signal may be applied to the data line in accordance with a data load signal.

The method may further include grouping a common electrode which generates an electric field together with the pixel electrode into a plurality of blocks to form the plurality of sensing output lines during the touch sensing period.

The method may further include connecting the plurality of blocks of the common electrode during the image display period.

The display device may further include a first substrate on which the switching element is formed and a second substrate which faces the first substrate, and the sensing output line may be disposed on any one of an outer surface of the first substrate, an outer surface of the second substrate, and an inner surface of the second substrate.

According to an exemplary embodiment of the present invention, the touch sensor is formed by utilizing a driving signal line provided in the display device so that a display device including a touch sensor may be manufactured to be lighter and thinner, power consumption may be reduced, and the manufacturing cost may be reduced.

Further, when the display device including a touch sensor detects the touch, it is possible to easily avoid the external noise.

Further, during the manufacturing process of the display device including a touch sensor, there is no need to separately form an electrode which transmits a sensing input signal, so that the number of optical masks required in the manufacturing process may be reduced.

DETAILED DESCRIPTION OF THE EMBODIMENTS

Figure 1:
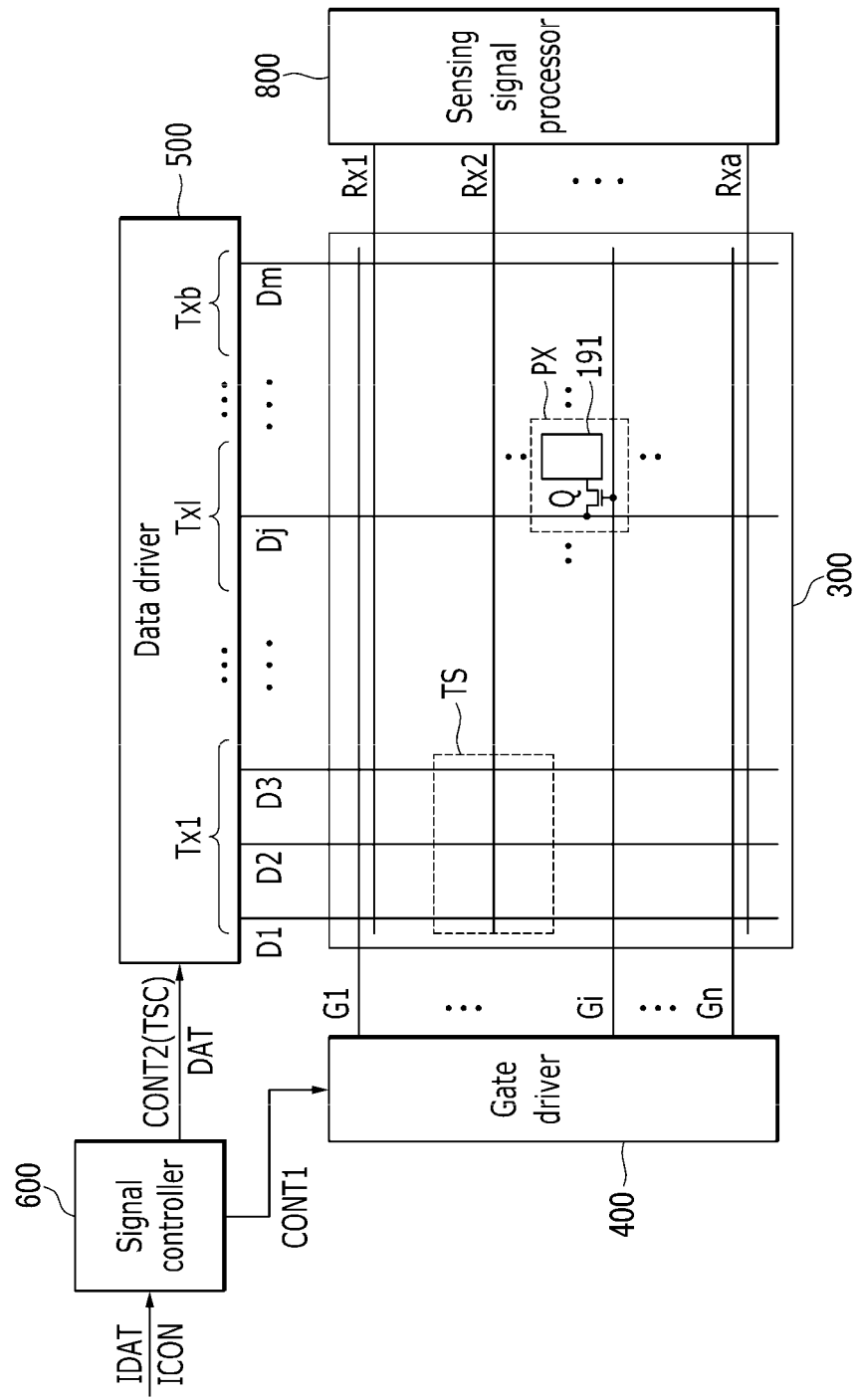
FIG. 1 is a block diagram of a display device including a touch sensor according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may have been exaggerated for clarity. Like reference numerals designate like elements throughout the specification. It will be understood that when an element such as a layer, film, region, or substrate is referred to as being "on" another element, it can be formed directly on the other element or formed on the other layer or substrate with one or more intervening elements therebetween. In contrast, when an element is referred to as being "directly on" another element, there are no intervening elements present.

Now, a display device including a touch sensor according to an exemplary embodiment of the present invention will be described with reference to FIGS. 1 and 2.

Figure 2:
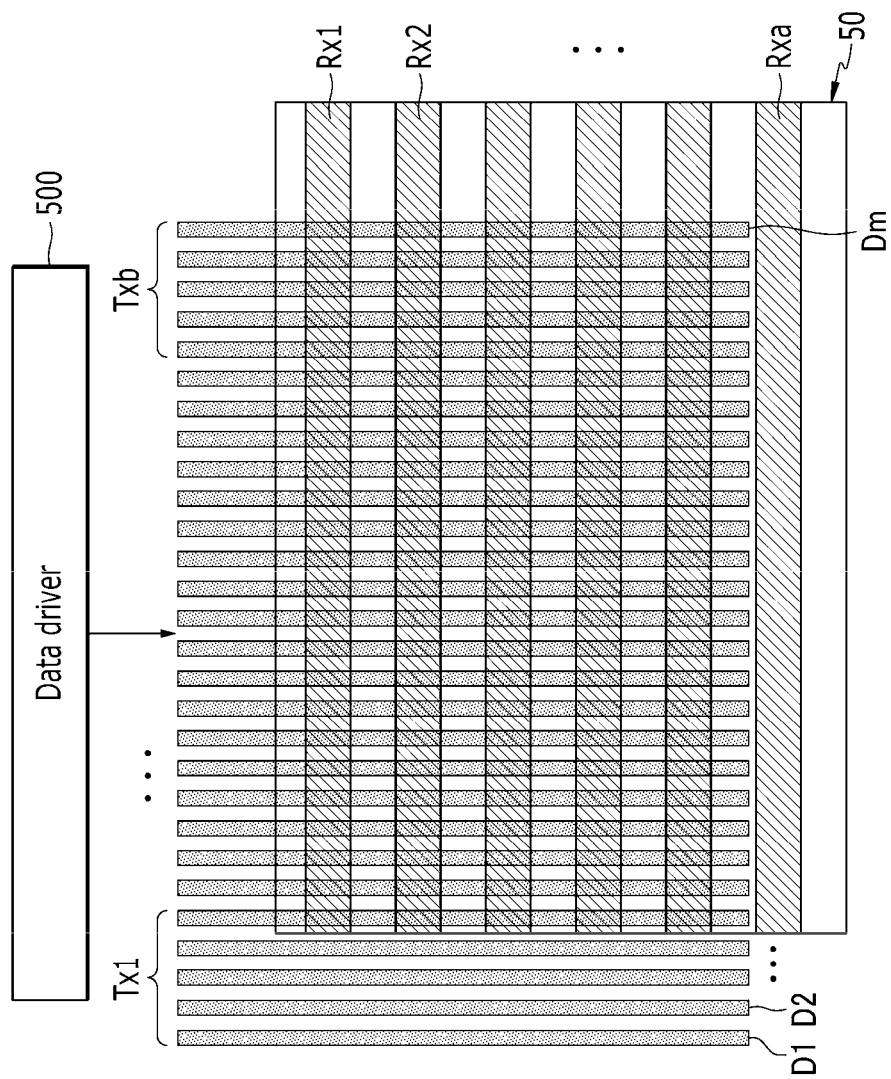
FIG. 2 is a plan view illustrating a sensing input electrode and a sensing output electrode of the display device including a touch sensor according to the exemplary embodiment of the present invention.

FIG. 1 is a block diagram of a display device including a touch sensor according to an exemplary embodiment of the present invention and FIG. 2 is a plan view illustrating a sensing input electrode and a sensing output electrode of the display device including a touch sensor according to the exemplary embodiment of the present invention.

Referring to FIG. 1, a display device including a touch sensor according to an exemplary embodiment of the present invention includes a display panel 300, gate driver 400, a data driver 500, a signal controller 600, and a sensing signal processor 800.

The display panel 300 may be a display panel which includes flat panel displays (FPD) such as a liquid crystal display (LCD), an organic light emitting diode (OLED) display, and an electrowetting display (EWD).

The display panel 300 includes a plurality of gate lines G1 to Gn, a plurality of data lines D1 to Dm, a plurality of pixels PX which is connected to the plurality of gate lines G1 to Gn and the plurality of data lines D1 to Dm, a plurality of sensing output lines Rx1 to Rxa, and a plurality of touch sensors TS.

The gate lines G1 to Gn transmit gate signals and extend approximately in a row direction to be approximately parallel to each other.

The data lines D1 to Dm transmit data voltages and extend approximately in a column direction to be approximately parallel to each other. The data voltage includes a displaying data voltage for an image display and a touching data voltage for a touch sensing which serves as a sensing input signal.

In the image display period, each of data lines D1 to Dm may transmit a displaying data voltage corresponding to an input image signal (IDAT).

In a touch sensing period, the plurality of data lines D1 to Dm, as illustrated in FIGS. 1 and 2, may be grouped to form a plurality of sensing input lines Tx1 to Txb which may have less number than that of the data lines. Each of the sensing input lines Tx1 to Txb may include at least one data line and the plurality of sensing input lines Tx1 to Txb may include the same number of data lines or a different number of data lines. In the touch sensing period, at least a part of the data lines D1 to Dm included in each of the sensing input lines Tx1 to Txb may transmit the same touching data voltage.

The plurality of pixels PX may be arranged approximately in a matrix. Each pixel PX includes at least one switching element Q which is connected to the corresponding gate line G1 to Gn and the corresponding data line D1 to Dm and at least one pixel electrode 191 which is connected to the switching element Q. The switching element Q may include at least one thin film transistor and may be turned on or off in accordance with the gate signal transmitted through the gate lines G1 to Gn and selectively supply the data voltages transmitted by the data lines D1 to Dm to the pixel electrodes 191. Each pixel PX may display an image having a luminance corresponding to the data voltage which is applied to the pixel electrode 191.

In order to implement color display, each pixel PX displays one of primary colors (spatial division) or each pixel alternately displays the primary colors during a predetermined time interval (time division) so that a desired color may be recognized by the sum of the primary colors. Examples of primary colors include three primary colors such as red, green, and blue colors. A plurality of adjacent pixels PX which displays different primary colors may form a dot which is minimum unit for color display. The sensing output lines Rx1 to Rxa transmit the sensing output signal and intersect the data lines D1 to Dm to be approximately parallel to each other. The sensing output line Rx1 to Rxa is connected to the sensing signal processor 800 and may supply the sensing output signal, which is generated in the touch sensor TS when touch of the display panel 300 occurs, to the sensing signal processor 800. The sensing output lines Rx1 to Rxa extend to be parallel to each other and are disposed in a sensing output line layer 50. The sensing output line layer 50 may be disposed inside the display panel 300 or on an outer surface of the display panel 300.

The touch sensor TS is a capacitive type touch sensor. The touch sensor TS generates a sensing output signal in response to a touch on the display panel 300. Referring to FIGS. 1 and 2, one touch sensor TS is formed at the intersection of one sensing input line Tx1 to Txb and one sensing output line Rx1 to Rxa.

More specifically, one touch sensor TS includes a sensing capacitor which is formed at the intersections of the one sensing input line of the sensing input lines Tx1 to Txb and the one sensing output line of the sensing output lines Rx1 to Rxa. The sensing capacitor Cm may be formed when a part of the sensing input lines Tx1 to Txb and a part of the sensing output lines Rx1 to Rxa overlap or are adjacent to each other.

The touch sensor TS receives the sensing input signal transmitted by the sensing input lines Tx1 to Txb and output a sensing output signal depending on a change in a quantity of charge of the sensing capacitor Cm due to a touch of an external object. More specifically, when a sensing input signal which is a touching data voltage is input to the touch sensor TS, the sensing capacitor of the touch sensor TS is charged with a predetermined quantity of electric charge and the changed quantity of electric charge in accordance with touch is output to the sensing output lines Rx1 to Rxa as a sensing output signal. That is, if there is a touch by an external object, the quantity of electric charge which is charged on the sensing capacitor is changed, and the sensing output signal is output to the sensing output lines Rx1 to Rxa according to the change on the quantity of electric charge. A voltage level of the sensing output signal when an object approaches or touches the display panel 300 may be lower than a voltage level of the sensing output signal when no object touches the display panel.

A length of one touch sensor TS may be approximately several mm and for example, approximately 4 to 5 mm. A size of the touch sensor TS may vary depending on a touch sensing resolution.

The gate driver 400 receives a gate control signal CONT1 from the signal controller 600 and generates a gate signal formed by a combination of a gate-on voltage Von which may turn on a switching element Q of the pixel PX and a gate-off voltage Voff which may turn off the switching element Q based on the gate control signal. The gate driver 400 is connected to the gate lines G1 to Gn of the display panel 300 to apply the gate signal to the gate lines G1 to Gn.

The data driver 500 receives a data control signal CONT2 and an output image signal DAT from the signal controller 600 and select a gray voltage corresponding to the output image signal DAT to generate a data voltage which is an analog data signal corresponding to the output image signal DAT. The output image signal DAT is a digital signal having a predetermined value (or a gray scale). The data driver 500 is connected to the data lines D1 to Dm of the display panel 300 and supplies the data voltage to the data lines D1 to Dm.

The data driver 500, as described above, connect at least one adjacent data lines D1 to Dm to each other to form a plurality of sensing input lines Tx1 to Txb in the touch sensing period. The data driver 500 transmits a same touching data voltage to the data lines D1 to Dm included in each of the sensing input lines Tx1 to Txb.

The signal controller 600 controls the gate driver 400 and the data driver 500.

The sensing signal processor 800 receives and processes the sensing output signal from the sensing output lines Rx1 to Rxa of the display panel 300. The sensing signal processor 800 uses the processed sensing output signal to generate touch information such as occurrence and position of touch. The sensing signal processor 800, as illustrated in FIG. 1, may be formed as a separate element or be included in the signal controller 600.

Now, with reference to FIGS. 3 to 5 together with FIGS. 1 and 2 described above, a driving method of a display device including a touch sensor according to an exemplary embodiment of the present invention will be described.

Figure 3:
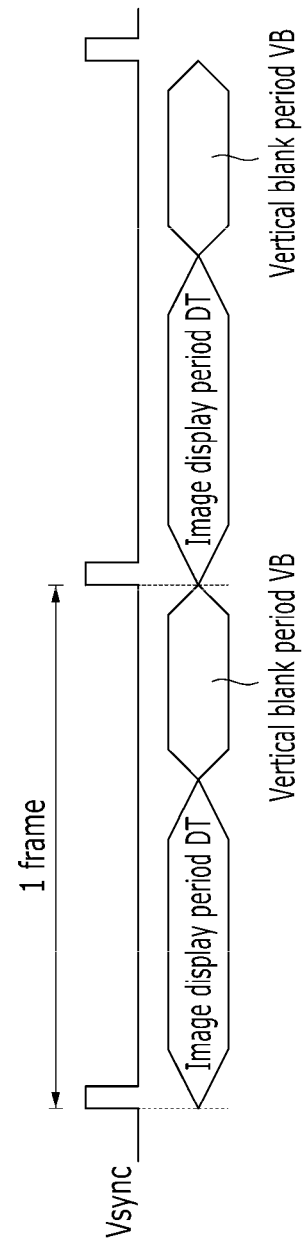
FIG. 3 is a timing chart of a display driving signal of the display device including a touch sensor according to the exemplary embodiment of the present invention.
Figure 4:
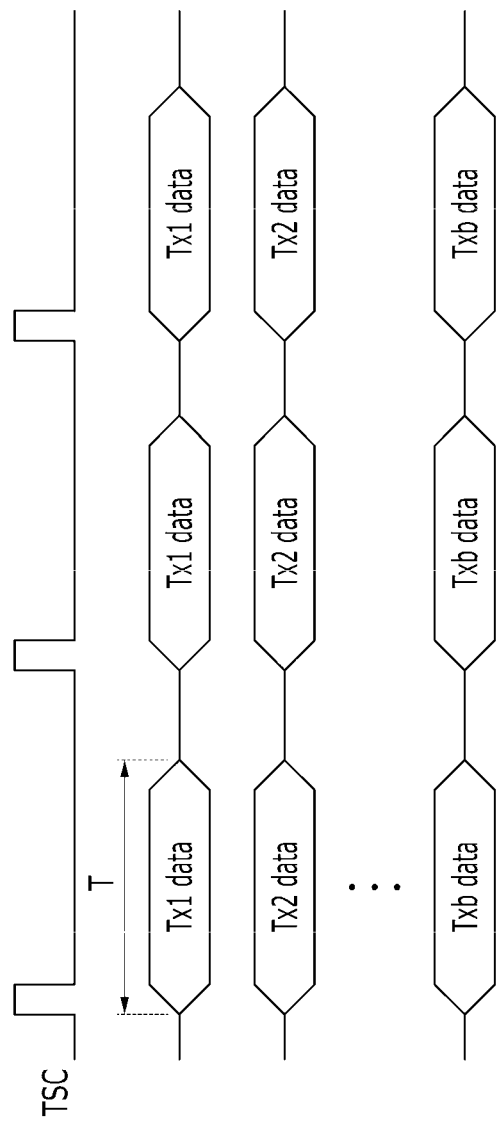
FIG. 4 is a timing chart of a touch sensing driving signal of the display device including a touch sensor according to the exemplary embodiment of the present invention.
Figure 5:
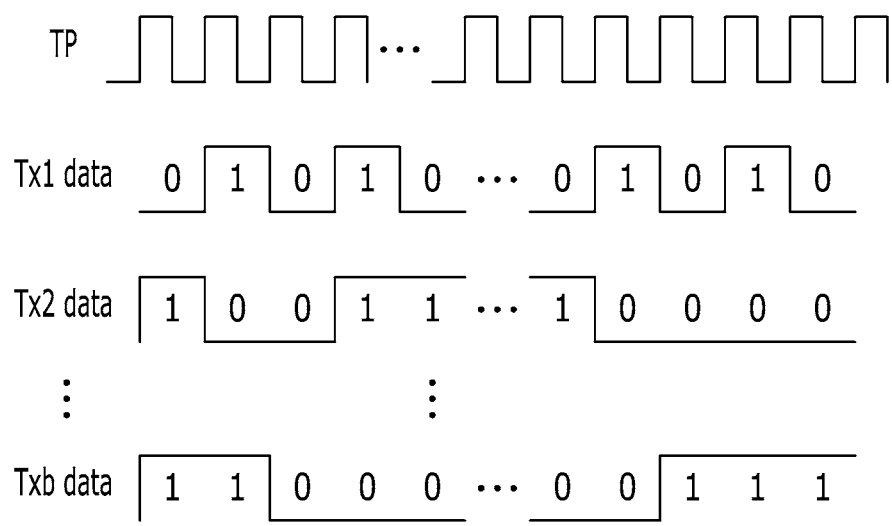
FIG. 5 is a waveform diagram of a sensing input signal of the display device including a touch sensor according to the exemplary embodiment of the present invention.

FIG. 3 is a timing chart of a display driving signal of the display device including a touch sensor according to the exemplary embodiment of the present invention, FIG. 4 is a timing chart of a touch sensing driving signal of the display device including a touch sensor according to the exemplary embodiment of the present invention, and FIG. 5 is a waveform diagram of a sensing input signal of the display device including a touch sensor according to the exemplary embodiment of the present invention.

The signal controller 600 receives an input image signal IDAT and an input control signal ICON which controls the input image signal IDAT from the outside to display images to the display device. The input image signal IDAT includes luminance information of each pixel PX and the luminance has a predetermined number of gray scales, for example, $1024=2^{10}$, $256=2^8$ or $64=2^6$ gray scales. The input control signal ICON may include a vertical synchronization signal Vsync, a horizontal synchronizing signal Hsync, a main clock signal CLK, and a data enable signal DE.

The signal controller 600 appropriately processes the input image signal IDAT according to the input control signal ICON to convert the input image signal IDAT into an output image signal DAT, generates a gate control signal CONT1 and a data control signal CONT2. The signal controller 600 sends the gate control signal CONT1 to the gate driver 400, and sends the data control signal CONT2 and the output image signal DAT to the data driver 500.

The gate control signal CONT1 includes a scanning start signal STV which instructs to start scanning and at least one gate clock signal CPV which controls an output timing of the gate-on voltage Von.

The data control signal CONT2 includes a horizontal synchronization start signal which notifies the start timing of transmitting the output image signal DAT to one row of pixels PX, at least one data load signal TP which allows the data voltage to be applied to the data lines D1 to Dm, a data clock signal, and a touch control signal TSC. The touch control signal TSC may control outputs of the displaying data voltage and the touching data voltage. Further, the data control signal CONT2 may include information on a structure of the sensing input lines Tx1 to Txb in the touch sensing period, that is, information on how the data lines D1 to Dm are grouped together to form the sensing input lines Tx1 to Txb.

One frame which is a cycle when the display panel 300 displays one image starts with a pulse of the vertical synchronization signal Vsync. One frame, as illustrated in FIG. 3, includes an image display period DT when the entire pixels PX display one image and a vertical blank period VB when no image is displayed on the pixel. The vertical blank period VB may be disposed between image display periods DT of neighboring frames.

When the image display period DT starts, the data driver 500 receives the output image signal DAT for one row of pixels PX in accordance with the data control signal CONT2 from the signal controller 600. The data driver 500 selects a gray voltage corresponding to each of output image signals DAT to convert the output image signal DAT into an analog data signal. The data driver 500 applies the converted analog data signal to the data lines D1 to Dm in accordance with the data load signal TP as a displaying data voltage.

The gate driver 400 sequentially applies the gate-on voltage Von to the gate lines G1 to Gn in accordance with the gate control signal CONT1 from the signal controller 600 in the image display period DT to turn on the switching element Q which is connected to the gate lines G1 to Gn. By doing this, the displaying data voltage which is applied to the data lines D1 to Dm is applied to the pixel PX through the turned-on switching element Q. A voltage difference between the display data voltage which is applied to the pixel PX and a common voltage Vcom is represented as a pixel voltage.

Referring to FIGS. 3 and 4, the vertical blank period VB starts when the image display period DT ends. The touch sensing period T may start with the vertical blank period VB. The touch sensing period T may start in synchronization with the touch control signal TSC. The touch sensing period T may be included in the vertical blank period VB. That is, a length of the touch sensing period T may be shorter than or equal to a length of the vertical blank period VB.

When the touch sensing period T starts, the data driver 500 converts sensing input data, which are digital signals, for each of the sensing input lines Tx1 to Txb into analog sensing input signals Tx1 data, Tx2 data, . . . , Txb data, which is an analog signal, having gray voltages. The data driver 500 applies the converted sensing input signal to the sensing input lines Tx1 to Txb as a touching data voltage in accordance with the data load signal TP. The sensing input signals Tx1 data, Tx2 data, . . . , Txb data may be input to all of the data lines D1 to Dm or a part of the data lines which are included in the corresponding sensing input lines Tx1 to Txb.

The sensing input data may be input from the signal controller 600 as a digital signal. Alternatively, the sensing input data may be generated by the data driver 500 or stored in a memory device in advance. The sensing input data may be two different gray scales of the input image signal IDAT or the output image signal DAT, for example, white gray data and black gray data.

Referring to FIG. 5, sensing input data having the sensing input signals Tx1 data, Tx2 data, . . . , Txb data which correspond to the respective sensing input lines Tx1 to Txb may be coded differently. For example, FIG. 5 illustrates an example of the sensing input data which have different codes. Two levels of the sensing input data, that is, the white gray data and the black gray data are indicated by "1" and "0", respectively. Accordingly, the sensing input signals Tx1 data, Tx2 data, . . . , Txb data which are input to the sensing input lines Tx1 to Txb of the display panel 300 are distinguished so that coordinates in the row direction of touched points are distinguished.

Further, driving frequencies of the sensing input signals Tx1 data, Tx2 data, . . . , Txb data may be changed in order to avoid a noise due to an external signal in the touch sensing period T. The driving frequencies of the sensing input signals Tx1 data, Tx2 data, . . . , Txb data may be easily changed by adjusting a cycle of the data load signal TP.

As described above, in the touch sensing period T, if sensing input signals Tx1 data, Tx2 data, . . . , Txb data are input to the sensing input lines Tx1 to Txb, the sensing capacitor of the touch sensor TS which is connected thereto is charged with a predetermined quantity of electric charge. The quantity of electric charge of the sensing capacitor which may be changed by touch or approach of the external object is output to the sensing output lines Rx1 to Rxa as a sensing output signal.

The sensing signal processor 800 receives and processes the sensing output signal from the sensing output lines Rx1 to Rxa of the display panel 300 to generate touch information such as occurrence and position of touch.

The gate-on voltage Von may not be applied to the gate lines G1 to Gn in the vertical blank period VB including the touch sensing period T. Accordingly, the data voltage which is applied to the pixel PX may be sustained during the vertical blank period VB and thus the influence to an image display quality due to the application of the touching data voltage in the touch sensing period T may not arise.

As described above, according to the exemplary embodiment of the present invention, the touch sensor is formed by utilizing the data lines D1 to Dm of the display device for displaying an image so that the display device may be manufactured to be lighter and thinner. Further, since there is no need to form a separate sensing input electrode, a manufacturing cost of the display device may further be reduced and a separate sensing input electrode does not need to be driven, which may further reduce the power consumption.

Now, a display device including a touch sensor according to an exemplary embodiment of the present invention will be described with reference to FIGS. 6 to 8.

Figure 6:
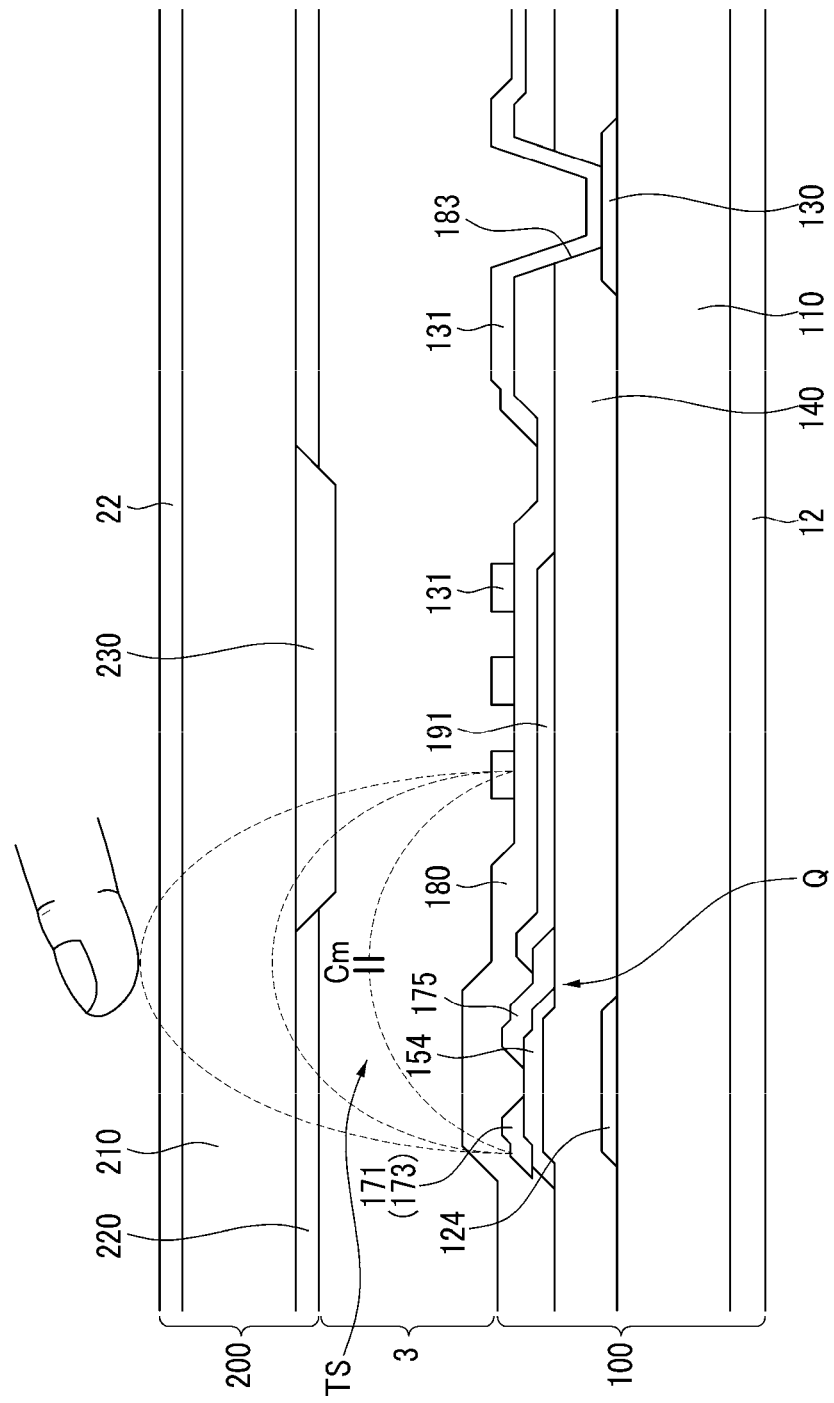
FIG. 6 is a cross-sectional view of the display device including a touch sensor according to the exemplary embodiment of the present invention.
Figure 7:
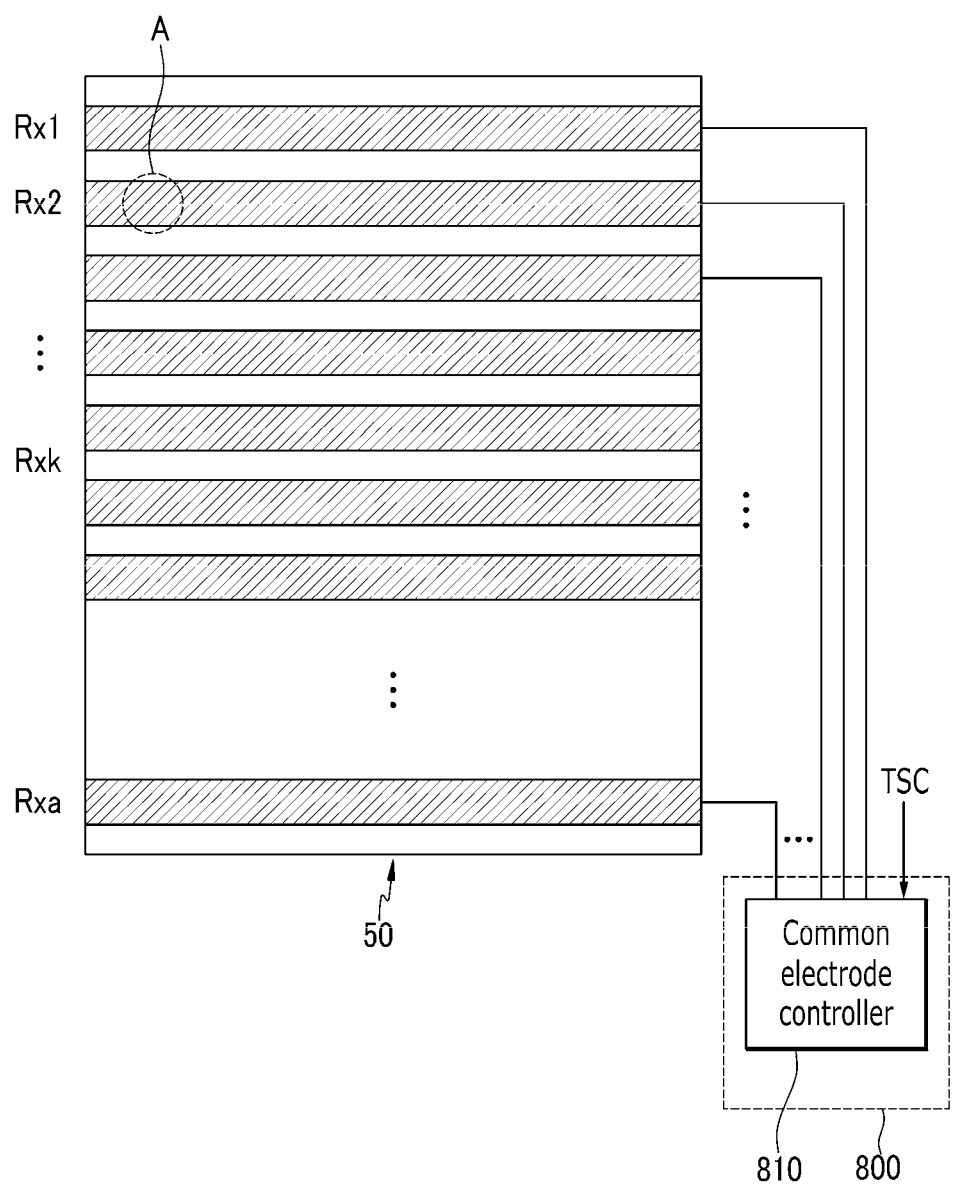
FIG. 7 is a layout view of a sensing output electrode of the display device including a touch sensor according to the exemplary embodiment of the present invention.
Figure 8:
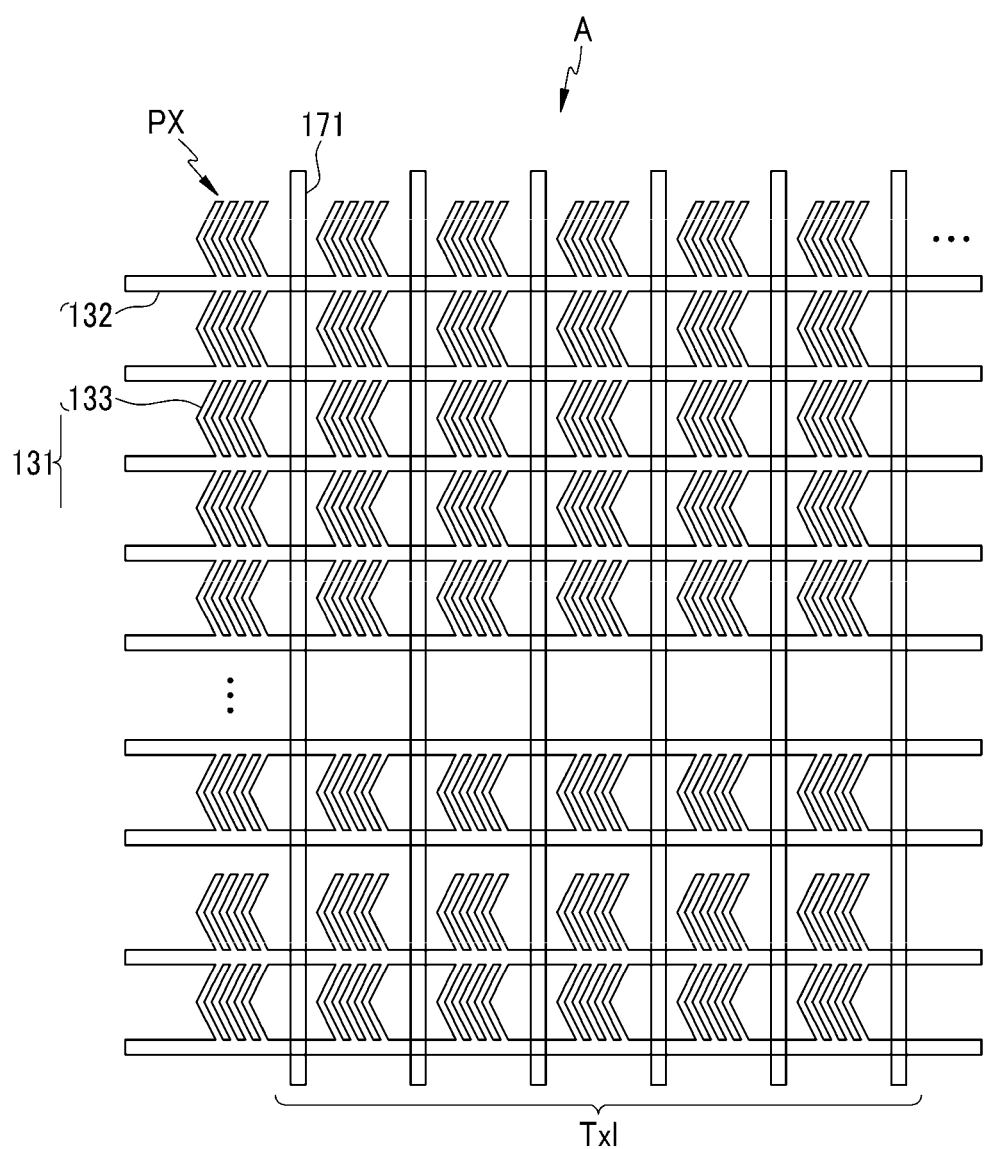
FIG. 8 is a plan view illustrating a structure of an electrode of the display device including a touch sensor according to the exemplary embodiment of the present invention, which enlarges a portion "A" of FIG. 7.

FIG. 6 is a cross-sectional view of the display device including a touch sensor according to the exemplary embodiment of the present invention, FIG. 7 is a layout view of a sensing output electrode of the display device including a touch sensor according to the exemplary embodiment of the present invention, and FIG. 8 is a plan view illustrating a structure of an electrode of the display device including a touch sensor according to the exemplary embodiment of the present invention, which enlarges a portion "A" of FIG. 7.

First, referring to FIG. 6, the display device including a touch sensor according to an exemplary embodiment of the present invention is a liquid crystal display device which includes a first display panel 100 and a second display panel 200 which face each other, and a liquid crystal layer 3 disposed between the two display panels 100 and 200. The first display panel 100, the second display panel 200 and the liquid crystal layer 3 may comprise the display panel 300.

The first display panel 100 will be described. A plurality of driving signal lines is disposed on an inner surface of the first substrate 110 which may be formed of an insulating material such as transparent glass or plastic. Here, the inner surface refers to a surface facing the liquid crystal layer 3 and an outer surface refers to a surface opposite to the inner surface, which will be same as in the following description. The driving signal line includes the gate line and the data line 171. The gate line may include a gate electrode 124. Further, a common voltage line 130 which transmits a constant voltage such as a common voltage Vcom may be further disposed on the first substrate 110.

A gate insulating layer 140 is disposed on the gate line including the gate electrode 124 and the common voltage line 130.

A semiconductor 154 which may be formed of amorphous silicon, polysilicon or an oxide semiconductor is disposed on the gate insulating layer 140. The semiconductor 154 may be overlap with at least a part of the gate electrode 124.

The source electrode 173 and the drain electrode 175 which face each other are disposed on the semiconductor 154. The source electrode 173 is connected to the data line 171 which transmits the data voltage. In FIG. 6, a source electrode 173 which is connected to the data line 171 is denoted by reference number in parentheses.

The gate electrode 124, the source electrode 173, and the drain electrode 175 form a thin film transistor Q together with the semiconductor 154. A channel of the thin film transistor Q is formed in the semiconductor 154 between the source electrode 173 and the drain electrode 175.

An ohmic contact (not illustrated) may be further formed between the semiconductor 154 and the source electrode 173 or between the semiconductor 154 and the drain electrode 175. The ohmic contact may be formed of a material such as a silicide or an n+ hydrogenated amorphous silicon with a highly doped n-type impurity such as phosphorus or arsenic ions.

The pixel electrode 191 is disposed on the drain electrode 175 and the gate insulating layer 140. The pixel electrode 191 may be directly in contact with a part of the drain electrode 175 and receive the data voltage from the drain electrode 175. The pixel electrode 191 may be formed of a transparent conductive material such as indium tin oxide (ITO) or indium zinc oxide (IZO).

A passivation layer 180 is disposed on the thin film transistor Q and the pixel electrode 191. The passivation layer 180 may be formed of an inorganic insulator such as silicon nitride or silicon oxide or an organic insulator. A contact hole 183 may be formed on the passivation layer 180 and the gate insulating layer 140 to expose the common voltage line 130.

The common electrode 131 may be disposed on the passivation layer 180. The common electrode 131 may include a plurality of branch electrodes which are overlap the pixel electrode 191. The common electrode 131 may be applied with the common voltage Vcom from the common voltage line 130 through the contact hole 183. However, the exemplary embodiment of the present invention is not limited to the structure including such a common electrode 131.

A polarizer 12 may be disposed on an outer surface of the first substrate 110.

Next, the second display panel 200 will be described. A light blocking member 220 and a color filter 230 are disposed on an inner surface of the second substrate 210 which may be formed of transparent glass or plastic. The light blocking member 220 is also referred to as a black matrix and blocks light leakage. Most of the color filters 230 may be disposed in a region enclosed by the light blocking member 220. The region enclosed by the light blocking member 220 may be defined as a pixel PX or a pixel area. At least one of the color filter 230 and the light blocking member 220 may be disposed in the first display panel 100.

A polarizer 22 may be disposed on an outer surface of the second substrate 210.

The liquid crystal layer 3 includes liquid crystal molecules (not illustrated) and the liquid crystal molecules may be aligned such that a major axis is parallel or vertical to the surfaces of the first and the second display panels 100 and 200 or aligned to be twisted when no electric field is applied.

According to the exemplary embodiment of the present invention, the pixel electrode 191 is applied with the data voltage through the thin film transistor Q during the image display period DT and the entire common electrodes 131 of the display panel 300 may be connected to each other to be applied with a constant common voltage Vcom. The pixel electrode 191 to which the data voltage is applied and the common electrode 131 may generate an electric field to the liquid crystal layer 3. The arrangement of the liquid crystal molecules varies depending on an applied pixel voltage. The polarization of light which passes through the liquid crystal layer 3 is changed according to the pixel voltage applied to the pixel electrode. The change in the polarization of light cause the change of light transmittance by the polarizers 12 and 22 and alter the luminance in accordance with the input image signal IDAT.

Referring to FIGS. 7 and 8, in the touch sensing period T, the common electrodes 131 form a plurality of blocks which is electrically separated from each other to form a plurality of sensing output lines Rx1 to Rxa as described above. In other words, the common electrodes 131 which are connected to a common voltage source in the image display period DT are divided into a plurality of blocks in the touch sensing period T. In each block, the common electrodes 131 are connected to each other and the common electrodes in different blocks are electrically disconnected from each other so as to form a plurality of sensing output lines Rx1 to Rxa which may transmit sensing output signals.

For this reason, the common electrode 131 may be connected to the common electrode controller 810. In accordance with the control of the touch control signal TSC, the common electrode controller 810 connects all common electrodes 131 of the display panel 300 to a common voltage source during the image display period DT and divides the common electrode 131 into a plurality of blocks to form a plurality of sensing output lines Rx1 to Rxa during the touch sensing period T. During the touch sensing period T, the common electrode 131 is connected to the sensing signal processor 800 to transmit the sensing output signal to the sensing signal processor 800. The common electrode controller 810, as illustrated in FIG. 7, may be included in the sensing signal processor 800.

Referring to FIGS. 7 and 8, the common electrodes 131 which form one sensing output line Rx1 to Rxa may include a plurality of horizontal portions 132 which extend in the row direction and a plurality of branch electrodes 133 which is connected to the horizontal portions 132 and disposed in each of the pixels PX. A predetermined number of neighboring data lines 171 which intersect one sensing output line Rx1 to Rxa, as described above, may form one sensing input line TxI (I=1, 2, ..., b) which transmits the same sensing input signal. As described above, one of the sensing output line Rx1 to Rxa and the sensing input line Tx1 which intersect each other form one touch sensor TS.

Referring to FIG. 6 again, the data line 171 which forms the sensing input line Tx1 to Txb and the common electrode 131 which forms the sensing output lines Rx1 to Rxa form the sensing capacitor Cm of the touch sensor TS. In this case, a touch by an external object may be generated on the outer surface of the second substrate 210. When the external object touches or approaches the display device, the quantity of the electric charge of the sensing capacitor Cm is varied, which may be detected through the sensing output signal.

Next, referring to FIG. 9, a display device including a touch sensor according to an exemplary embodiment of the present invention will be described. The same component comprised in the above description is denoted by the same reference numeral and the redundant description will be omitted.

Figure 9:
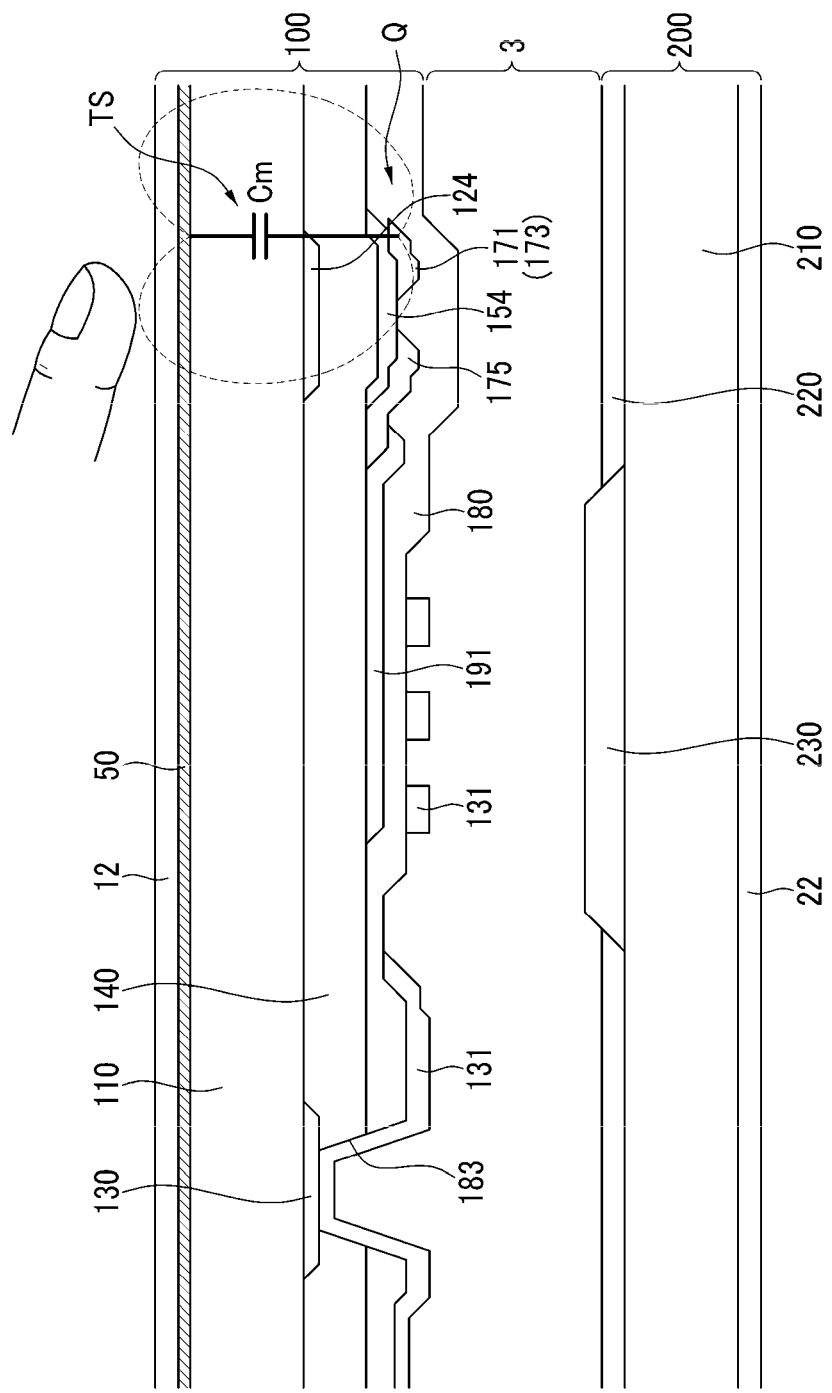
FIGS. 9 to 12 are cross-sectional views of the display device including a touch sensor according to the exemplary embodiment of the present invention.

FIG. 9 is a cross-sectional view of the display device including a touch sensor according to the exemplary embodiment of the present invention.

The exemplary embodiment illustrated in FIG. 9 is the same as the exemplary embodiment illustrated in FIG. 6 which is described above in the most parts but the common electrode 131 does not form the sensing output lines Rx1 to Rxa, but separate sensing output lines Rx1 to Rxa may be further formed. In this case, during the manufacturing process of the display device, an additional mask for forming the sensing output lines Rx1 to Rxa may be required.

More specifically, according to the present exemplary embodiment, the sensing output line layer 50 on which the plurality of sensing output lines Rx1 to Rxa is disposed may be disposed on the outer surface of the first substrate 110. In this case, the sensing output line layer 50 may be disposed between the first substrate 110 and the polarizer 12.

The sensing output lines Rx1 to Rxa of the sensing output line layer 50 form the sensing capacitor Cm of the touch sensor TS together with the data line 171. The first substrate 110 or the gate insulating layer 140 which is disposed between the sensing output line layer 50 and the data line 171 may serve as a dielectric material of the sensing capacitor Cm. In this case, a touch by the external object may be generated on the outer surface of the first substrate 110.

The sensing output lines Rx1 to Rxa of the sensing output line layer 50 may be formed of a transparent conductive material such as ITO (indium tin oxide) or IZO (indium zinc oxide) or a nontransparent conductive material such as metal. When the sensing output lines Rx1 to Rxa are opaque, the sensing output lines Rx1 to Rxa may be blocked by the light blocking member 220 or an opaque signal line.

Next, referring to FIG. 10, a display device including a touch sensor according to an exemplary embodiment of the present invention will be described.

Figure 10:
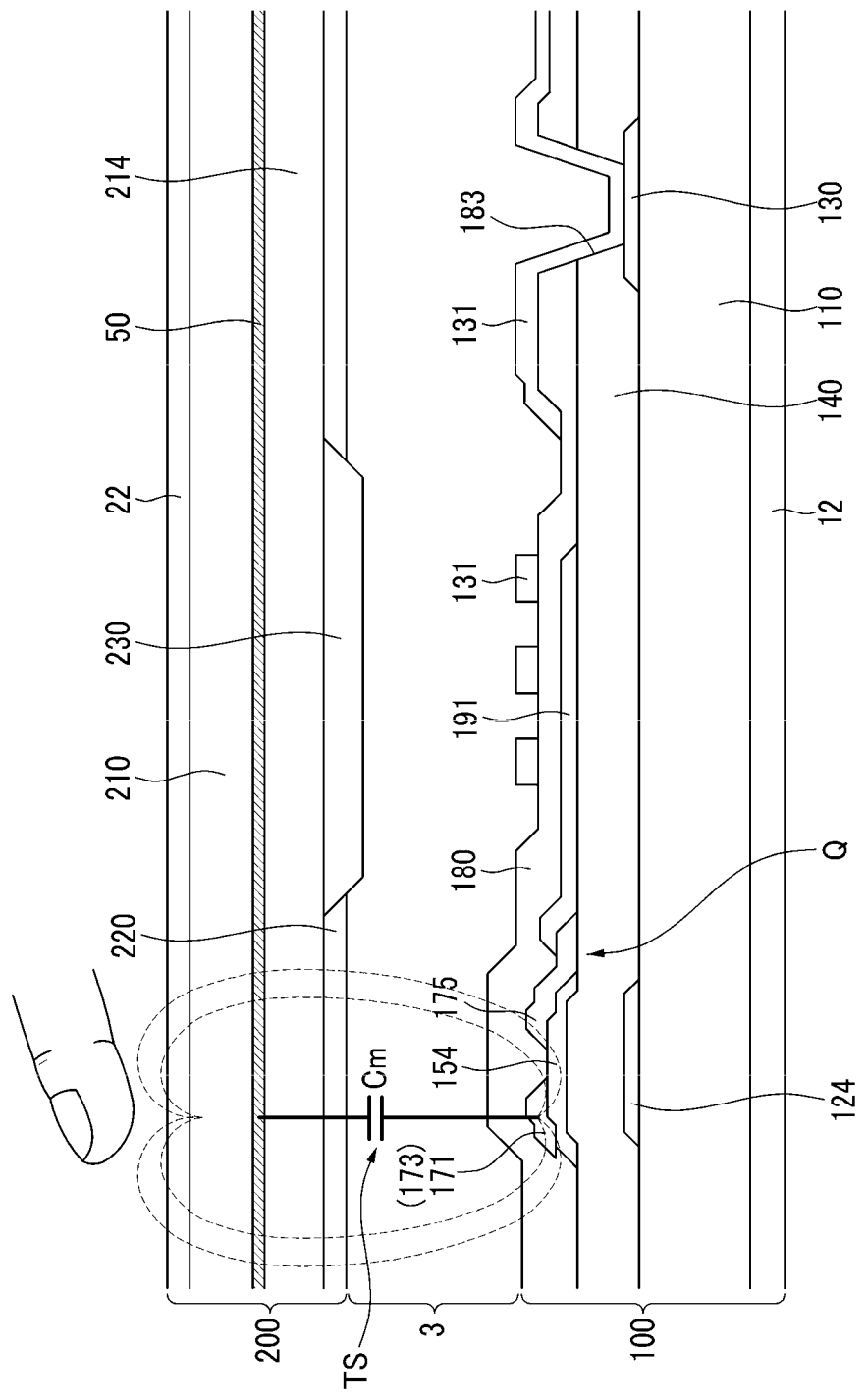

FIG. 10 is a cross-sectional view of the display device including a touch sensor according to the exemplary embodiment of the present invention.

The exemplary embodiment illustrated in FIG. 10 is same as the exemplary embodiment illustrated in FIG. 9 which is described above in the most parts, but the sensing output line layer 50 may be disposed on the inner surface of the second substrate 210 rather than the outer surface of the first substrate 110. In this case, an insulating layer 214 may be further disposed between the sensing output line layer 50 and the color filter 230 or the light blocking member 220. The insulating layer 214 may contain an organic insulating material or an inorganic insulating material such as silicon nitride.

In the manufacturing process of the display device according to the present exemplary embodiment, the sensing output lines Rx1 to Rxa of the sensing output line layer 50 may be formed by laminating and patterning a transparent conductive material such as ITO or IZO or nontransparent conductive material before forming the color filter 230 and the light blocking member 220.

The sensing output lines Rx1 to Rxa of the sensing output line layer 50 form the sensing capacitor Cm of the touch sensor TS together with the data line 171. In this case, a touch by the external object may be generated on the outer surface of the second substrate 210.

Next, referring to FIG. 11, a display device including a touch sensor according to an exemplary embodiment of the present invention will be described.

Figure 11:
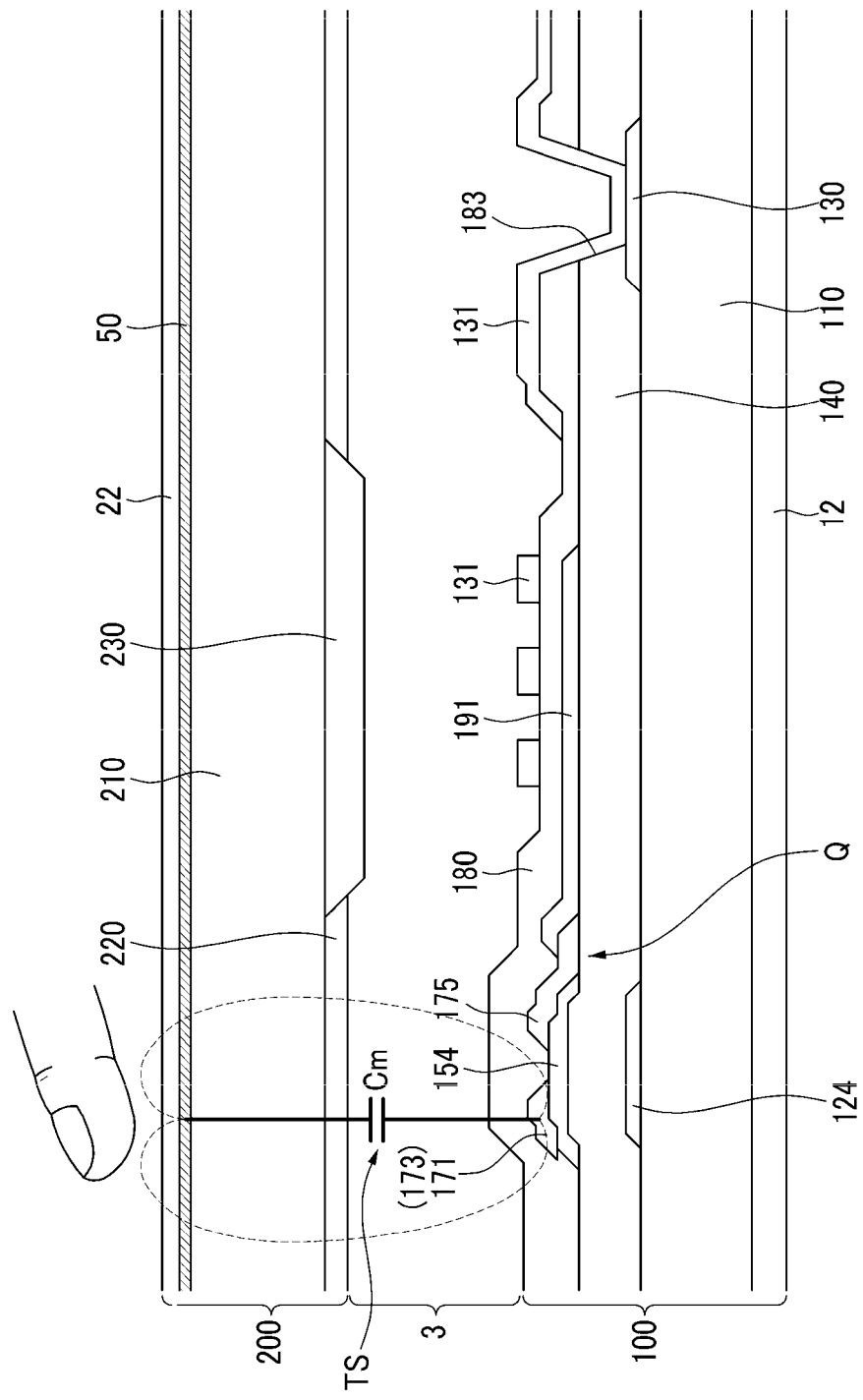

FIG. 11 is a cross-sectional view of the display device including a touch sensor according to the exemplary embodiment of the present invention.

The exemplary embodiment illustrated in FIG. 11 is same as the exemplary embodiment illustrated in FIG. 9 which is described above in the most parts, but the sensing output line layer 50 may be disposed on the outer surface of the second substrate 210 rather than the outer surface of the first substrate 110. In this case, the sensing output line layer 50 may be disposed between the second substrate 210 and the polarizer 22.

The sensing output lines Rx1 to Rxa of the sensing output line layer 50 form the sensing capacitor Cm of the touch sensor TS together with the data line 171. In this case, a touch by the external object may be generated on the outer surface of the second substrate 210.

The sensing output line layer 50 forms the sensing capacitor Cm of the touch sensor TS together with the data line 171. In this case, a touch by the external object may be generated on the outer surface of the second substrate 210.

Otherwise, the sensing output line layer 50 may be disposed on various layers.

Finally, referring to FIG. 12, a display device including a touch sensor according to an exemplary embodiment of the present invention will be described.

Figure 12:
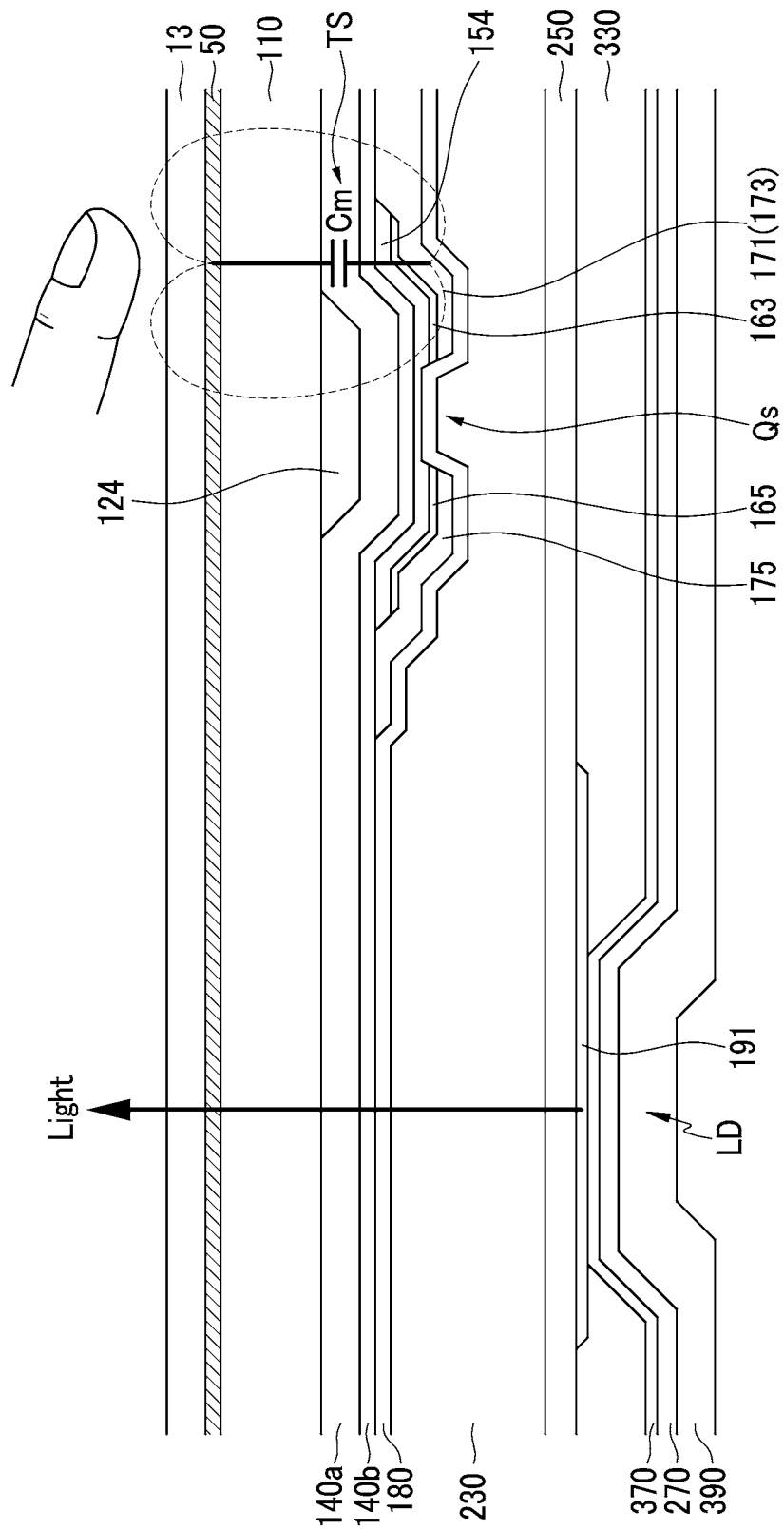

FIG. 12 is a cross-sectional view of the display device including a touch sensor according to the exemplary embodiment of the present invention.

The display device according to the present exemplary embodiment is an organic light emitting diode (OLED) display (organic light emitting display device) and includes a plurality of pixels PX which is arranged in a matrix and a plurality of driving signal lines.

The display device including a touch sensor according to the exemplary embodiment of the present invention includes the first substrate 110 which is formed of transparent glass or plastic and the driving signal line is disposed on the inner surface of the first substrate 110. The driving signal line includes a gate line which transmits a gate signal to a control terminal of the switching element Qs of the pixel PX. The gate line may include the gate electrode 124.

The gate insulating layer 140 is disposed on the gate line which includes the gate electrode 124 and the semiconductor 154 is disposed thereon. Ohmic contact islands 163 and 165 may be disposed on the semiconductor 154 and the source electrode 173 and the drain electrode 175 which face each other are disposed thereon. The source electrode 173 is connected to the data line 171 which transmits the data voltage. In FIG. 12, a source electrode 173 which is connected to the data line 171 is denoted by reference number in parentheses.

The gate electrode 124, the source electrode 173, and the drain electrode 175 may form a switching element Qs which transmits the data voltage to the pixel PX together with the semiconductor 154.

The passivation layer 180 is disposed on the drain electrode 175 and the source electrode 173. Even though not illustrated, the control terminal of the driving switching element may be electrically connected to the drain electrode 175 of the switching element Qs.

The color filter 230 may be disposed on the switching element Qs. The color filter 230 may be omitted.

An overcoat (overcoat layer) 250 may be disposed on the color filter 230. The overcoat 250 may be an insulating layer having a planarizing function.

The pixel electrode 191 which is electrically connected to an output terminal of the driving switching element (not illustrated) is disposed on the overcoat 250. The pixel electrode 191 may be formed of a transparent conductive material such as ITO or IZO.

An organic light emitting member 370 is formed on the pixel electrode 191. The organic light emitting member 370 may emit white light. If the color filter 230 is omitted, the organic light emitting member 370 which is disposed in each pixel PX may emit light with one of the primary colors.

In the meantime, a partition 330 may be further formed between the pixel electrode 191 and the organic light emitting member 370. The partition 330 may define an opening by enclosing the edge of the pixel electrode 191 like a bank. The partition 330 includes a black pigment to serve as a light blocking member.

An opposed electrode 270 which transmits the common voltage Vcom is formed on the organic light emitting member 370. The opposed electrode 270 may be formed of a reflective metal including calcium (Ca), barium (Ba), magnesium (Mg), aluminum (Al), and silver (Ag).

An encapsulation layer 390 may be disposed on the opposed electrode 270. The encapsulation layer 390 encapsulates the organic light emitting member 370 and the opposed electrode 270 to prevent moisture and/or oxygen from passing therethrough from the outside.

The pixel electrode 191, the organic light emitting member 370, and the opposed electrode 270 form an organic light emitting diode element OLED. The organic light emitting diode element OLED emits light above the outer surface of the first substrate 110 to display an image.

In the present exemplary embodiment, the sensing output line layer 50 may be disposed on the outer surface of the first substrate 110. The sensing output lines Rx1 to Rxa of the sensing output line layer 50 form the sensing capacitor Cm together with the data line 171. In this case, a tempered glass 13 may be further attached on the outer surface of the sensing output line layer 50.

In addition to the illustration of FIG. 12, the sensing output line layer 50 may be disposed on various layers.

Further, without forming a separate sensing output line layer 50, the opposed electrode 270 may be used as the sensing output lines Rx1 to Rxa. That is, like the exemplary embodiment described with reference to FIGS. 6 to 8 described above, during the image display period DT, the opposed electrodes 270 are connected to each other to transfer a constant common voltage Vcom and during the touch sensing period T, the common electrode 131 is divided into a plurality of blocks to form a plurality of sensing output lines Rx1 to Rxa.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a plurality of data lines which extend in a first direction;
a plurality of sensing output lines which extend in a second direction which is not parallel to the first direction and transmit a sensing output signal;
a pixel electrode which is connected with a data line of the plurality of data lines through a switching element;
a touch sensor which is connected to the data line and a sensing output line of the plurality of sensing output lines and detects a touch; and
a data driver which disconnect the plurality of data lines from each other to apply displaying data voltages to the respective data lines during an image display period of a frame, and connect a portion of the data lines to each other to form a plurality of sensing input lines to apply sensing input signals to the plurality of sensing input lines during a touch sensing period of the frame after the image display period,
wherein the touch sensing period is included in a vertical blank period of the frame.

2. The display device of claim 1, further comprising:
a gate driver which transmits a gate signal to the switching element during the image display period.

3. The display device of claim 2, wherein:
the data driver converts an output image signal into the displaying data voltage using a plurality of gray voltages and converts a sensing input data into the sensing input signal using the plurality of gray voltages.

4. The display device of claim 3, wherein:
during the touch sensing period, the plurality of data lines are grouped into a plurality of sensing input lines having at least one data line, and
the sensing input signals which are transmitted by the plurality of sensing input lines are coded differently.

5. The display device of claim 4, wherein:
the sensing input data includes white gray data and black gray data.

6. The display device of claim 5, wherein:
the sensing input signal is applied to the data line in accordance with a data load signal.

7. The display device of claim 3, further comprising:
a common electrode which transmits a common voltage and generates an electric field together with the pixel electrode, and
a common electrode controller which divides the common electrode into a plurality of blocks to form the plurality of sensing output lines during the touch sensing period.

8. The display device of claim 7, wherein:
the common electrode controller connects the plurality of blocks of the common electrode to a common voltage source during the image display period.

9. The display device of claim 3, further comprising:
a first substrate on which the switching element and the pixel electrode are formed,
wherein the sensing output line is disposed on an outer surface of the first substrate.

10. The display device of claim 3, further comprising:
a first substrate on which the switching element and the pixel electrode are formed; and
a second substrate which faces the second substrate,
wherein the sensing output line is disposed on an outer surface or an inner surface of the second substrate.

11. The display device of claim 10, wherein:
the sensing output line includes a transparent conductive material including ITO and IZO.

12. A driving method of a display device including a plurality of data lines which extend in a first direction, a plurality of sensing output lines which extend in a second direction which is not parallel to the first direction and a touch sensor which is connected to a data line of the plurality of data lines and a sensing output line of the plurality of sensing output lines and detects a touch, the method comprising:
applying displaying data voltages to the plurality of data lines during an image display period of a frame;
applying a sensing input signal to the plurality of data lines during a touch sensing period of the frame after the image display period; and
outputting sensing output signals to the plurality of sensing output lines,
wherein the touch sensing period is included in a vertical blank period of the frame.

13. The method of claim 12, further comprising:
transmitting a gate signal to the switching element which is connected to the data line during the image display period.

14. The method of claim 13, further comprising:
converting an output image signal which is a digital signal into the displaying data voltage using a plurality of gray voltages, and
converting a sensing input data which is a digital signal into the sensing input signal using the plurality of gray voltages.

15. The method of claim 14, wherein:
during the touch sensing period, the plurality of data lines form a plurality of sensing input lines, each of the plurality of sensing input lines including at least one data line, and
the input sensing signal includes a plurality of sensing input signals which are transmitted by the plurality of sensing input lines, the sensing input signals being are coded differently.

16. The method of claim 15, wherein:
the sensing input data includes white gray data and black gray data.

17. The method of claim 16, wherein:
the sensing input signal is applied to the data line in accordance with a data load signal.

18. The method of claim 14, further comprising:
during the touch sensing period, grouping a common electrode which generates an electric field together with the pixel electrode into a plurality of blocks to form the plurality of sensing output lines.

19. The method of claim 18, further comprising:
connecting the plurality of blocks of the common electrode during the image display period.

20. The method of claim 14, wherein:
the display device further includes a first substrate on which the switching element is formed and a second substrate which faces the first substrate, and
the sensing output line is disposed on any one of an outer surface of the first substrate, an outer surface of the second substrate, and an inner surface of the second substrate.

* * * * *